(12) United States Patent
Parrish et al.

(10) Patent No.: US 10,082,098 B2
(45) Date of Patent: Sep. 25, 2018

(54) SYSTEMS AND METHODS FOR CONTROLLING FLUID INJECTIONS

(71) Applicant: GM GLOBAL TECHNOLOGY OPERATIONS LLC, Detroit, MI (US)

(72) Inventors: Scott E. Parrish, Farmington Hills, MI (US); Yiran Hu, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 15/299,795

(22) Filed: Oct. 21, 2016

(65) Prior Publication Data

US 2018/0112621 A1    Apr. 26, 2018

(51) Int. Cl.
| | | |
|---|---|---|
| *F02B 3/00* | (2006.01) | |
| *F02D 41/40* | (2006.01) | |
| *F02M 51/06* | (2006.01) | |

(52) U.S. Cl.
CPC ......... *F02D 41/402* (2013.01); *F02D 41/401* (2013.01); *F02M 51/061* (2013.01)

(58) Field of Classification Search
CPC ............................ F02D 41/401; F02D 41/402
USPC .................................................. 123/299–300
See application file for complete search history.

(56) References Cited

U.S. PATENT DOCUMENTS

| | | | | |
|---|---|---|---|---|
| 4,875,452 A | * | 10/1989 | Hara ..................... | F02D 41/345 123/488 |
| 5,381,297 A | | 1/1995 | Weber | |
| 6,279,538 B1 | * | 8/2001 | Herweg ................ | F02D 35/021 123/406.26 |
| 7,770,813 B2 | | 8/2010 | Parrish | |
| 8,755,988 B2 | | 6/2014 | Parrish et al. | |
| 2001/0023679 A1 | * | 9/2001 | Ganser .................... | F02D 41/10 123/406.47 |
| 2004/0050360 A1 | * | 3/2004 | Happenhofer ...... | F02D 41/2422 123/299 |
| 2007/0119413 A1 | * | 5/2007 | Lewis ................. | F02D 41/0025 123/295 |
| 2008/0276907 A1 | * | 11/2008 | Abe ........................ | F02D 41/20 123/472 |
| 2012/0323468 A1 | * | 12/2012 | Miyaura ................ | F02D 41/40 701/105 |
| 2015/0040871 A1 | | 2/2015 | Ravenda | |
| 2016/0222904 A1 | * | 8/2016 | Juhasz .................... | F02D 41/26 |
| 2017/0191442 A1 | * | 7/2017 | Polonowski .......... | F02D 41/064 |

FOREIGN PATENT DOCUMENTS

| | | |
|---|---|---|
| WO | 2015/143107 A1 | 9/2015 |
| WO | 2015/143109 A1 | 9/2015 |

* cited by examiner

*Primary Examiner* — Thomas Moulis
(74) *Attorney, Agent, or Firm* — Quinn IP Law

(57) ABSTRACT

A vehicle includes a combustion engine having at least one cylinder to burn a fuel, and a fuel injector to supply a fuel mass to the at least one cylinder. The vehicle also includes a controller programmed to cause the fuel injector supply a series of fuel pulses that sum to an aggregate target fuel mass. The controller is also programmed to adjust a commanded duration of a subsequent pulse of the series of pulses from a target pulse duration value based on at least one of a dwell time since a preceding pulse, a fuel mass of the preceding pulse, and an opening delay of the preceding pulse.

17 Claims, 12 Drawing Sheets

SYSTEMS AND METHODS FOR CONTROLLING FLUID INJECTIONS

TECHNICAL FIELD

The present disclosure relates to controlling fluid pulse injections. More specifically, the disclosure is related to fuel injection for a combustion engine.

INTRODUCTION

Electronic fuel injection may be used to regulate fuel delivery in internal combustion engines. Certain example fuel injectors can be solenoid-actuated or piezo-electric valve devices disposed at a fuel intake portion of an engine. The fuel injectors may be positioned to deliver pressurized fuel into a combustion chamber of an engine cylinder. Each injector may be energized during combustion cycles for a period of time (i.e., for an injection duration) based upon the engine operating conditions. Multiple fuel injection events can occur during each combustion cycle for each cylinder. The fuel mass and timing of the multiple injections influences the quality of combustion and the overall fuel efficiency.

SUMMARY

A vehicle includes a combustion engine having at least one cylinder to burn a fuel, and a fuel injector to supply a fuel mass to the at least one cylinder. The vehicle also includes a controller programmed to cause the fuel injector to supply a series of fuel pulses that sum to an aggregate target fuel mass. The controller is also programmed to adjust a commanded duration of a subsequent pulse of the series of pulses from a target pulse duration value based on at least one of a dwell time since a preceding pulse, a fuel mass of the preceding pulse, an opening delay of the preceding pulse,.

A method of providing closely-spaced fluid pulses through a solenoid-driven valve includes providing a pressurized fluid at a valve inlet, and commanding a first pulse of the valve to supply a first fluid mass through the valve. The method also includes commanding a second pulse of the valve sequentially following the first pulse. A second pulse width is adjusted based on at least one of a dwell time following the first pulse and the first fluid mass such that a desired second fluid mass is achieved. In some examples, the second fuel mass may be substantially the same as the first fluid mass.

A fluid delivery system includes a solenoid configured to selectively lift a pintle of a valve to allow a pressurized fluid to pass through the valve. The fluid delivery system also includes a power source to supply energy to activate the solenoid. The fluid delivery system further includes a controller programmed to issue commands to actuate the solenoid to cause a series of sequential fluid pulses. A commanded opening delay of a subsequent pulse of the series of sequential pulses is adjusted based on at least one of dwell time since a preceding pulse, a fuel mass of the preceding pulse, and an opening delay of the preceding pulse.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
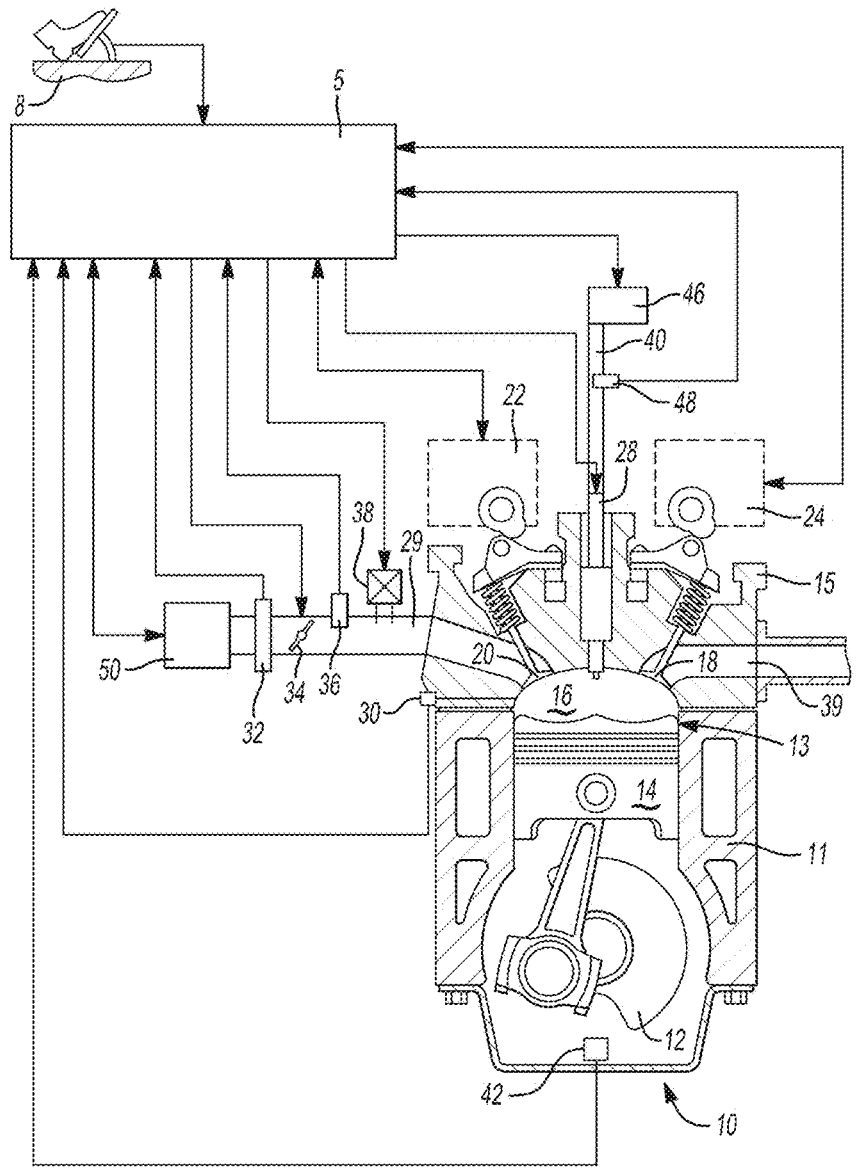
FIG. 1 is a schematic view of a combustion engine.

Referring to FIG. 1, an internal combustion engine 10 outputs torque as part of a vehicle propulsion system. The engine 10 may be selectively operative in a plurality of combustion modes, including auto-ignition combustion modes and a spark-ignition combustion modes. Intake air is mixed with a combustible fuel and burned within a combustion chamber. The engine 10 may be selectively operated using a stoichiometric ratio of air to fuel. Under certain operating conditions the air-fuel ratio is deliberately adjusted to be either rich or lean relative to a stoichiometric mix. Aspects of the present disclosure may also be applied to various types of internal combustion engine systems and combustion cycles. The engine 10 is selectively coupled to a transmission to transmit tractive power through a driveline of the vehicle to at least one road wheel. The transmission can include a hybrid transmission including additional propulsion sources to provide supplemental tractive power to the driveline.

Engine 10 may be a multi-cylinder, direct-injection, four-stroke internal combustion engine having at least one reciprocating piston 14 that is slidably movable within a cylinder 13. It should be appreciated that the systems and methods of the present disclosure may equally apply to different combustion cycles, for example such as those corresponding to two-stroke combustion engines. Movement of the piston 14 within a respective cylinder 13 provides a variable volume combustion chamber 16. Each piston 14 is connected to a rotating crankshaft 12 which translates linear reciprocating motion into rotational motion to rotate a driveline component.

An air intake system provides intake air to an intake manifold 29 which directs and distributes air to the combustion chambers 16. The air intake system may include airflow ductwork and devices for monitoring and controlling the airflow. The air intake system may also include a mass airflow sensor 32 for monitoring mass airflow and intake air temperature. An electronically-controlled throttle valve 34 may be used to control airflow to the engine 10. A pressure sensor 36 in the intake manifold 29 may be provided to monitor manifold absolute pressure and barometric pressure. An external flow passage (not shown) may also be provided to recirculate exhaust gases from engine exhaust back to the intake manifold 29. The flow of the recirculated exhaust gases may be regulated by an exhaust gas recirculation (EGR) valve 38. The engine 10 can include other systems, including a turbocharger system 50, or alternatively, a supercharger system to pressurize the intake air delivered to the engine 10.

Airflow from the intake manifold 29 to the combustion chamber 16 is regulated by one or more intake valves 20. Exhaust flow leaving of the combustion chamber 16 to an exhaust manifold 39 is regulated by one or more exhaust valves 18. The opening and closing of the intake and exhaust valves 20, 18 can be controlled and adjusted by controlling intake and exhaust variable lift control devices 22 and 24, respectively. The intake and exhaust lift control devices 22 and 24 may be configured to control and operate an intake camshaft 21 and an exhaust camshaft 23, respectively. The rotations of the intake and exhaust camshafts 21 and 23 are mechanically linked and indexed to the rotation timing of the crankshaft 12. Thus the opening and closing of the intake and exhaust valves 20, 18 is coordinated with the positions of the crankshaft 12 and the pistons 14.

The variable lift control devices 22, 24 may also include a controllable mechanism to vary the magnitude of valve lift, or opening, of the intake and exhaust valve(s) 20 and 18, respectively. The lift magnitude may be varied according to discrete steps (e.g. high lift or low lift) or continuously varied. The valve lift position may be varied according to the operating conditions of propulsion system, including the torque demands of the engine 10. The variable lift control devices 22, 24 may further include a variable cam phasing mechanism to control and adjust phasing (i.e., relative timing) of opening and closing of the intake valves 20 and the exhaust valves, 18 respectively. Phase adjustment includes shifting opening times of the intake and exhaust valves 20, 18 relative to positions of the crankshaft 12 and the piston 14 in the respective cylinder 15.

The variable lift control devices 22, 24 each may be capable of a range of phasing of about 60-90 degrees relative to crank rotation, to permit advancing or retarding the opening and closing of one of intake and exhaust valves 20, 18 relative to position of the piston 14 for each cylinder 15. The range of phasing is defined and limited by the intake and exhaust variable lift control devices 22, 24, which include camshaft position sensors to determine rotational positions of the intake and the exhaust camshafts 21, 23. Variable lift control devices 22, 24 may be actuated using one of electro-hydraulic, hydraulic, and electric control force, controlled by the controller 5.

The engine 10 also includes a fuel injection system including a plurality of high-pressure fuel injectors 28 each configured to directly inject a predetermined mass of fuel into one of the combustion chambers 16 in response to a signal from the controller 5. While a single fuel injector is depicted in FIG. 1 for illustration purposes, the propulsion system may include any number of fuel injectors according to the number of combustion cylinders. The fuel injectors 28 are supplied pressurized fuel from a fuel distribution system through a fuel rail 40. A pressure sensor 48 monitors fuel rail pressure within the fuel rail 40 and outputs a signal corresponding to the fuel rail pressure to the controller 5.

The fuel distribution system also includes a high-pressure fuel pump 46 to deliver pressurized fuel to the fuel injectors 28 via the fuel rail 40. For example, the high-pressure pump 46 may generate fuel pressure delivered to the fuel rail 20 at pressures up to about 5,000 psi. In some examples, even higher fuel pressures may be employed. The controller 5 determines a target fuel rail pressure based on an operator torque request and engine speed, and the pressure is controlled using fuel pump 46. In one example, the fuel injector 28 includes a solenoid-actuated device to open a nozzle to inject fuel. However it is contemplated that aspects of the present disclosure may also apply to a fuel injector that utilizes a piezoelectric-actuated device or other types of actuation to distribute fuel. The fuel injector 28 also includes a nozzle placed through an opening in the cylinder head 15 to inject pressurized fuel into the combustion chamber 16. The nozzle of the fuel injector 28 includes a fuel injector tip characterized by a number of openings, a spray angle, and a volumetric flow rate at a given pressure. An exemplary fuel injector nozzle may include an 8-hole configuration having a 70 degree spray angle and a flow rate of 10 cc/s at about 1,450 psi.

Each fuel injector may include a pintle portion near a tip of the nozzle. The pintle interfaces with the nozzle to restrict or cutoff fuel flow when biased against an orifice. When the fuel injector is activated using energy supplied from a power source. A solenoid responds to the energy and actuates the pintle, lifting it away from the orifice to allow the high-pressure fuel to flow through. Fuel flows around the pintle and is ejected through the openings near the tip of the nozzle to spray into the combustion cylinder 16 to mix with air to facilitate combustion. A spark-ignition system may be provided such that spark energy is supplied to a spark plug for igniting or assisting in igniting cylinder charges in each of the combustion chambers 16 in response to a signal from the controller 5.

A series of multiple pintle lifts, or fuel pulses, may occur in rapid succession to obtain an optimal combustion condition without over-saturating the combustion cylinder. For example, a single longer pulse to achieve a desired target fuel mass may cause a larger than optimal depth of spray penetration into the cylinder. In contrast, multiple smaller pulses in succession that aggregate to a target fuel mass may have less overall penetration into the cylinder and create a more desirable combustion condition that results in better fuel economy and reduced emissions (e.g., particulates).

The controller 5 issues fuel pulse width (FPW) commands to influence the duration over which the injector is held open allowing fuel to pass. The fuel injectors may operate in both of linear and non-linear regions of fuel mass delivery with respect to injection duration. Linear regions of fuel mass delivery include commanded injection durations, having corresponding known and unique fuel mass deliveries at a given fuel pressure. Linear regions of fuel mass delivery include regions where fuel mass delivery increases monotonically with increased injection durations at constant fuel pressure. However non-linear regions of fuel mass delivery include commanded injection durations having unknown or unpredictable fuel mass deliveries at a given fuel pressure, including non-monotonic regions where the fuel injector can deliver the same fuel mass quantity at different injection durations. Boundaries of the linear and non-linear regions may vary for different fuel injector systems.

The engine 10 is equipped with various sensing devices for monitoring engine operation, including a crank sensor 42 capable of outputting RPM data and crankshaft rotational position. A pressure sensor 30 outputs a signal indicative of in-cylinder pressure which is monitored by controller 5. The pressure sensor 30 can include a pressure transducer that translates the in-cylinder pressure level to an electric signal. The pressure sensor 30 monitors in-cylinder pressure in real-time, including during each combustion event. An exhaust gas sensor 39 is configured to monitor exhaust gases, typically an air/fuel ratio sensor. Output signals from each of the combustion pressure sensor 30 and the crank sensor 42 are monitored by the controller 5 which determines combustion phasing, i.e., timing of combustion pressure relative to the crank angle of the crankshaft 12 for each cylinder 15 for each combustion event. Preferably, the engine 10 and controller 5 are mechanized to monitor and determine states of effective pressure for each of the engine cylinders 13 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, processor and similar terms used herein mean any suitable device or various combinations of devices, including Application Specific Integrated Circuit(s) (ASIC), electronic circuit(s), central processing unit(s) (preferably including microprocessors), and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The controller 5 includes a set of control algorithms, including resident software program instructions and calibrations stored in memory and executed to provide desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals during ongoing engine and vehicle operation. Alternatively, algorithms may be executed in response to occurrence of one more event observed by the controller.

The controller 5 is also programmed to control the throttle valve 34 to control mass flow of intake air into the engine via a control signal. In one example, the throttle valve 34 is commanded to wide open throttle to control manifold pressure by modifying both an intake air quantity and a recirculated exhaust gas quantity. The turbocharger system 50 preferably includes a variable geometry turbine (VGT) device. The controller 5 sends a signal to direct the angle of vanes of the VGT device. The angle of the vanes is measured with a VGT position sensor to provide feedback control to the controller 5. The controller 5 regulates the level of pressure boost thereby controlling the intake air quantity and the recirculated exhaust gas quantity. In other examples, a supercharger system can be utilized to modify the manifold pressure in analogous fashion.

The controller 5 is further programmed to control quantity exhaust gas recirculation by controlling opening of the exhaust gas recirculation valve 38. By controlling the opening of the exhaust gas recirculation valve 38, the controller 5 regulates the recirculated exhaust gas rate and the ratio of exhaust gas quantity to intake gas quantity.

Figure 2:
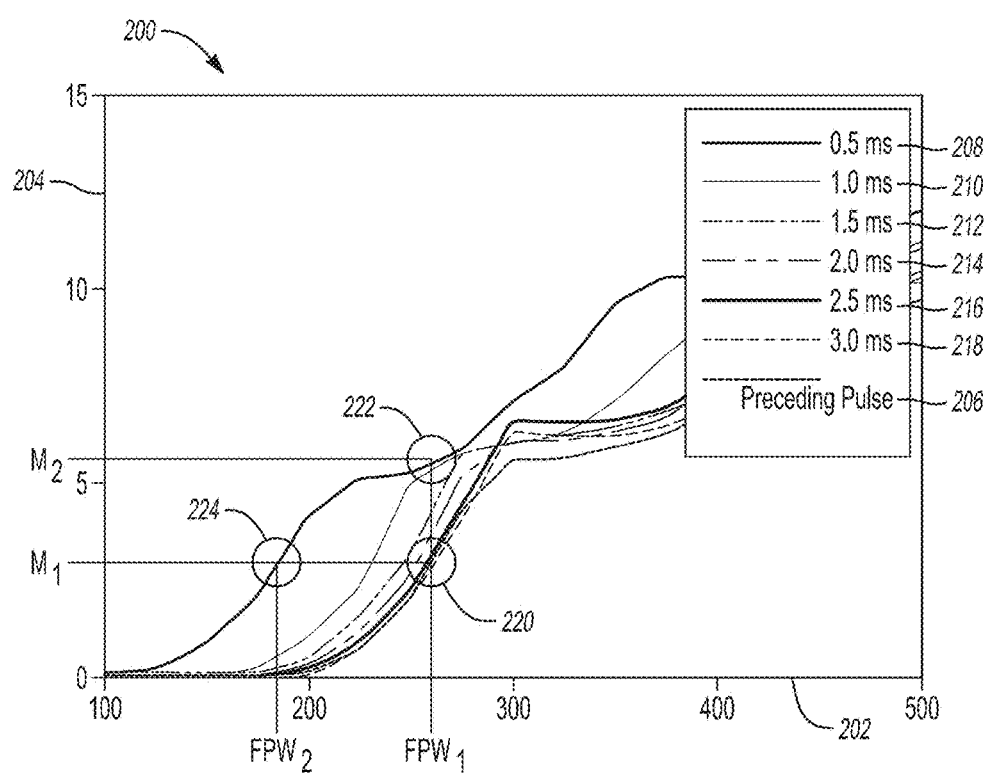
FIG. 2 is a plot of injected fuel mass versus commanded pulse width.

The controller 5 is further programmed to command a start of injection (SOI) corresponding to position of the piston 14 based on input from the crank sensor 42 during ongoing operation of the engine 10. The controller 5 causes a fuel injection event using the fuel injector 28 for each combustion event for each cylinder 13. Injection events may be defined by injector open pulse duration and injected fuel mass. In at least one example, the controller 5 commands a plurality of successive fuel injections during each combustion event. The aggregate fuel mass delivered during each combustion event is selected by the controller 5 based at least on the operator torque request. The controller 5 monitors input signals from the operator, for example, through a position of an accelerator pedal 8 to determine the operator torque request. The controller 5 issues commands to operate the fuel injector to supply a series of fuel pulses that sum to an aggregate target fuel mass As discussed above, applying multiple fuel pulses in close succession may cause effects on subsequent pulses due to residual energy remaining in the fuel injector as well as residual armature motion from earlier pulses. Referring to FIG. 2, plot 200 depicts the effect on a subsequent pulse as a function of injection pulse width and injection fuel mass of the preceding first pulse, as well as the duration since the previous pulse (i.e., dwell). In the example provided, preceding pulse was set to a fuel mass of 2 mg. Horizontal axis 202 represents commanded injection duration in microseconds (µs), and vertical axis 204 represents the fuel mass of the injection pulse in milligrams (mg). Generally, the longer the duration of the dwell time, the less the impact the preceding pulse width imparts on the subsequent pulse following the dwell.

With specific reference to FIG. 2, curve 206 represents a profile of a single injection, or baseline pulse. Generally, curve 206 serves as an established characteristic baseline curve without the influence of residual electromagnetic energy. It can be seen that a commanded pulse width $FPW_1$ at location 220 is about 260 µs in duration and injects total fuel mass $M_1$ of about 2.5 mg. However when a closely-spaced injection pulse follows the initial pulse, the duration of the subsequent pulse may be skewed causing an error in the aggregate fuel mass injected. Said another way, characteristic flow curves can shift (e.g., to shorter times) due to the effects of residual energy. If a single injection flow curve were used for subsequent injection events, a large flow error can be induced. Curve 208 represents a profile of a subsequent pulse delivered after a 0.5 ms dwell following a preceding 2 mg pulse. The response of the subsequent pulse is altered even when issued the same commanded pulse width input. For example, as seen at location 222 a commanded pulse width $FPW_1$ of about 260 µs yields a total mass $M_2$ injected of about 5.5 mg when applied as a subsequent pulse having a 0.5 ms dwell. If the subsequent pulse is desired to yield the same fuel mass as the preceding pulse, a reduced commanded pulse width may be input to obtain the desired mass. With continued reference to FIG. 2 and shown at location 224, a shortened commanded pulse width $FPW_2$ of about 190 µs yields a fuel mass $M_1$ of about 2.5 mg that is equal to the mass of the initial pulse. Each of the curves 210, 212, 214, 216, and 218 corresponding to dwell times of 1 ms, 1.5 ms, 2.0 ms, 2.5 ms, and 3.0 ms, respectively indicate various deviations from the injection profile 206 of a preceding pulse due to being closely-spaced following the initial injection.

According to aspects of the present disclosure, the commanded pulse width FPW of a subsequent fuel pulse may be adjusted based on at least one of the fuel mass of a preceding fuel pulse and a duration since the previous pulse. More specifically, the profiles of the various subsequent fuel pulses of FIG. 2 may each be shifted or otherwise adjusted to better align with the performance of a previous fuel pulse. Such an adjustment allows for more accurate fuel mass delivery of subsequent fuel pulses, and allows each of a series of pulses to achieve a targeted fuel mass while firing at a closely-spaced timing with respect to one another thereby improving combustion efficiency.

Figure 3:
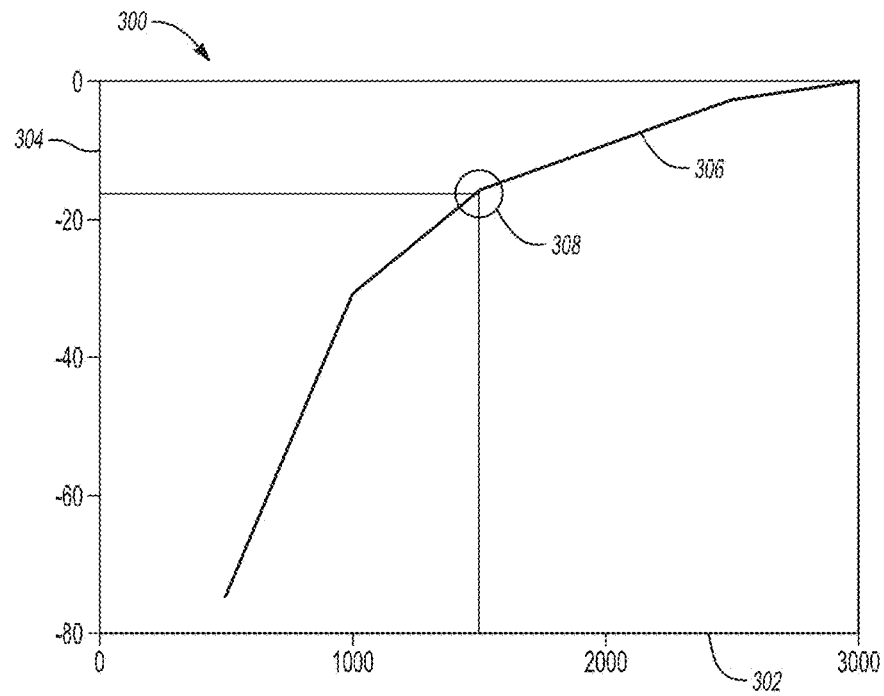
FIG. 3 is a plot of commanded pulse width adjustment versus dwell time.

Referring to FIG. 3, plot 300 depicts a required shift profile for the commanded pulse width FPW of a subsequent pulse based on the dwell time since the preceding pulse. Horizontal axis 302 represents dwell time since the preceding first pulse in microseconds (µs), and vertical axis 304 represents the FPW shift in µs required to compensate for dwell effects and obtain a matching injection mass to the preceding first pulse. Curve 306 represents the adjustment in pulse duration required to compensate for dwell time since the preceding pulse. The example curve 306 provided corresponds to a single fuel pressure of about 12 MPa, but it should be appreciated that a range of curves may exist corresponding to each of a range of different fuel pressures. Referring to location 308, a dwell time of about 1,500 µs may require a reduction in the baseline commanded pulse width of about 18 µs. It can be seen from plot 300 that at shorter dwell times, more significant reduction in commanded pulse width of the second pulse may be necessary to obtain a uniform injected fuel mass. In contrast, once the dwell time is greater than about 3,000 µs, effects on the subsequent fuel pulse due to dwell time becomes negligible, and substantially zero adjustment is required. Generally stated, the longer the dwell time after a preceding injection, a lesser degree of adjustment is required for the subsequent injection to deliver a predetermined fuel mass for a particular open duration. According to at least one example, the duration of a subsequent open pulse is reduced in response to a decrease in dwell time from the preceding pulse.

Figure 4:
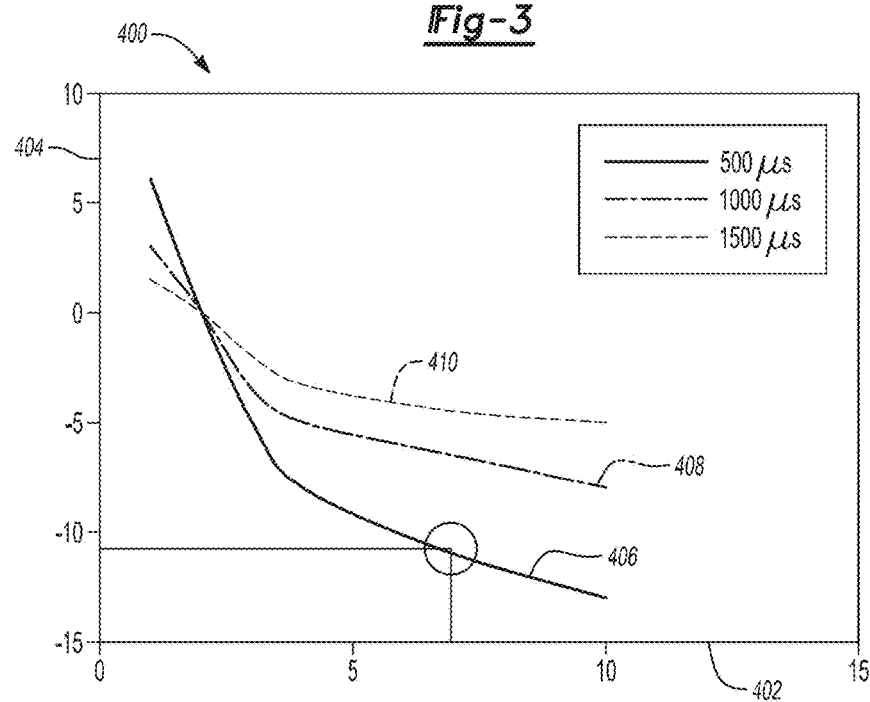
FIG. 4 is a plot of commanded pulse width adjustment versus preceding pulse fuel mass.

Referring to FIG. 4, plot 400 depicts a required shift profile for the commanded pulse width FPW of a subsequent pulse based on the dwell time following the preceding pulse. Horizontal axis 402 represents fuel mass of the preceding pulse in mg. The vertical axis 404 represents the FPW shift in µs required to compensate for fuel mass effects and obtain a uniform injection mass relative to a single pulse. Curve 406 represents an adjustment profile for a desired 500 µs dwell, curve 408 represents an adjustment profile for a desired 1,000 µs dwell, and curve 410 represents an adjustment profile for a desired 1,500 µs dwell. It can be seen that the larger the mass of the preceding first pulse, more compensation of the subsequent FPW command is required to obtain an accurate subsequent pulse fuel mass. Additionally, larger desired subsequent pulses are less affected by the fuel mass of a preceding pulse Referring to curve 406, a preceding pulse delivering a fuel mass of about 7 mg requires a reduction in the commanded pulse width of the subsequent pulse of about 11 µs to obtain a desired fuel mass. Generally stated, the greater the fuel mass of the preceding injection, a greater degree of adjustment is required for the subsequent injection to achieve a predetermined fuel mass.

Both of the derived adjustments due to each of dwell time and previous fuel mass may be combined to apply an open-loop control strategy to adjust closely-spaced subsequent pulses to account for effects from previous pulses. Such a strategy significantly reduces error in fuel mass delivery associated with closely-spaced multiple-injection operation of solenoid actuated fuel injectors. According to at least one example, a lookup table is stored in a memory of the controller that includes adjustments for subsequent pulses that are a function of the preceding injection fuel quantity and the dwell time since the preceding fuel injection.

Figure 5:
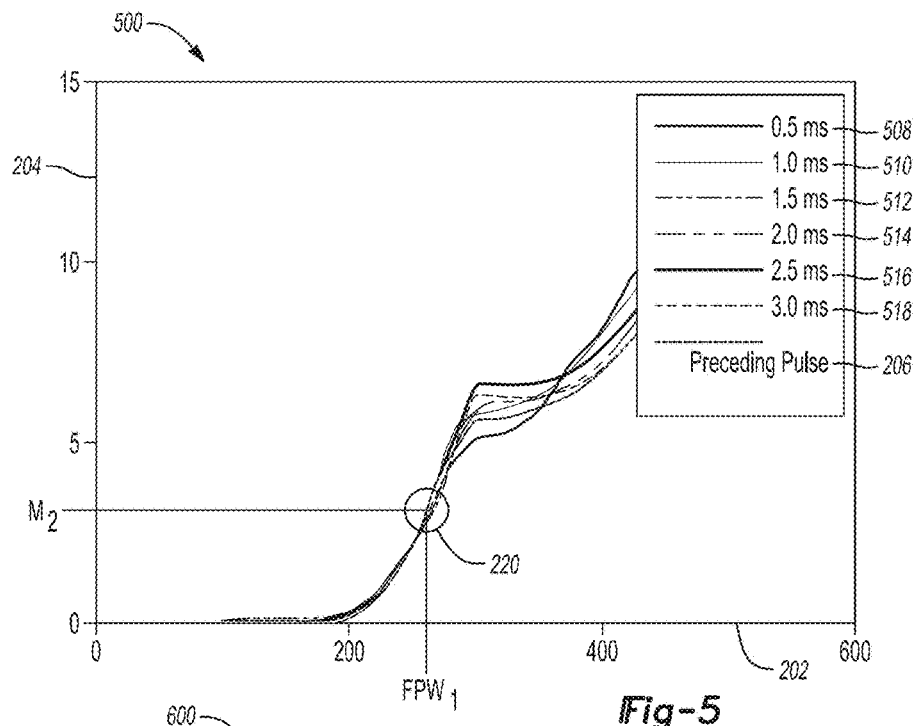
FIG. 5 is a plot of injection pulse fuel mass versus adjusted commanded pulse width.

Referring to FIG. 5, plot 500 depicts a result of adjusting a subsequent fuel pulse as a function of both of the previous pulse injected fuel mass, as well as the dwell time since the previous pulse. FIG. 5 corresponds to an improved closely-spaced injection pulse condition relative to the operating conditions of FIG. 2 discussed above. Curve 206 remains as discussed above and represents a profile of a single injection, or baseline pulse. However each of the curves representing subsequent pulses have been adjusted to compensate for the effects of both dwell time from the previous injection and the fuel mass of the preceding injection. The adjustment provides significant overlap between the profile of the behavior of a single injection pulse and the profiles of each of the subsequent injection pulses. Each of curves 508, 510, 512, 514, 516, and 518 corresponds to dwell times of 0.5 ms, 1 ms, 1.5 ms, 2.0 ms, 2.5 ms, and 3.0 ms, respectively. The adjustments of the more closely-spaced subsequent injections show substantially reduced deviation from the injection profile 206 of the initial pulse. Referring back to the previous example at location 220, the commanded pulse width $FPW_1$ of about 260 μs in duration causes an injected total fuel mass $M_1$ of about 2.5 mg. Applying the adjustments for dwell time and fuel mass described above, the subsequent pulses having an adjusted commanded pulse width $FPW_1$ each provide a fuel mass consistent with that of the single injection pulse.

Figure 6A:
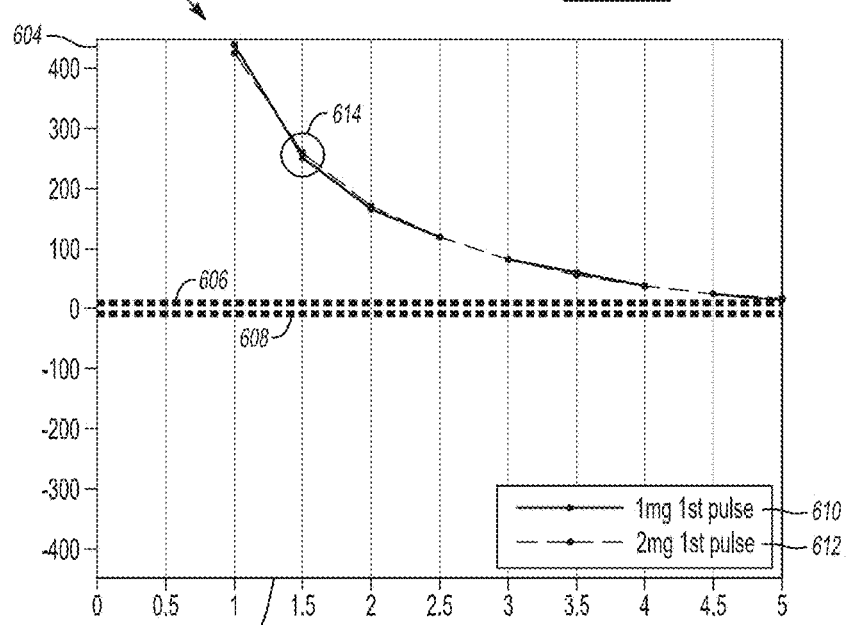
FIG. 6A is a plot of percent fuel mass error versus desired subsequent pulse fuel mass corresponding to no command adjustment.
Figure 6B:
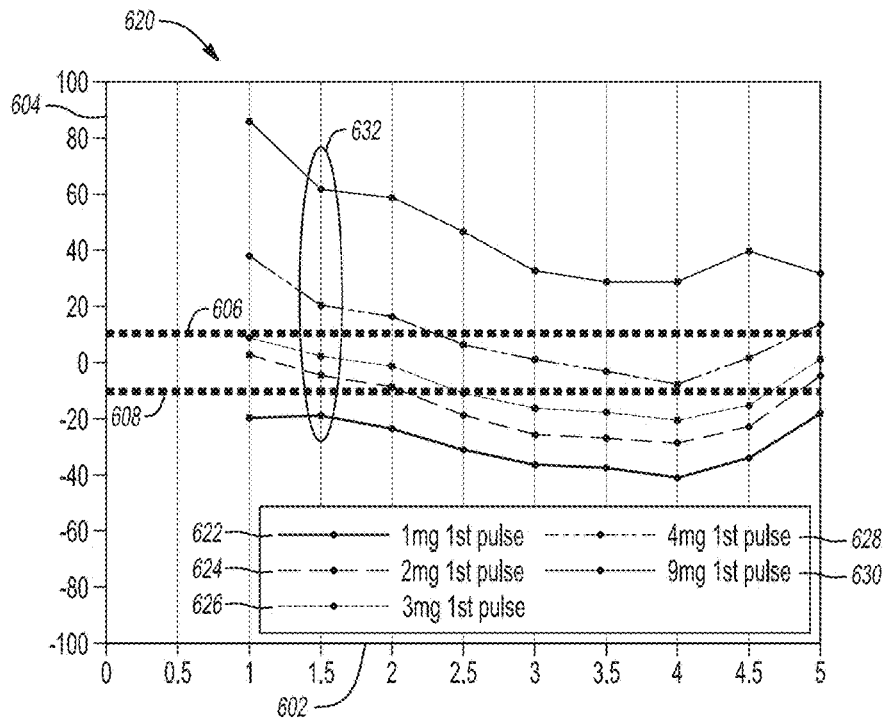
FIG. 6B is a plot of percent fuel mass error versus desired subsequent pulse fuel mass corresponding to commanded pulse width adjustment for dwell time.
Figure 6C:
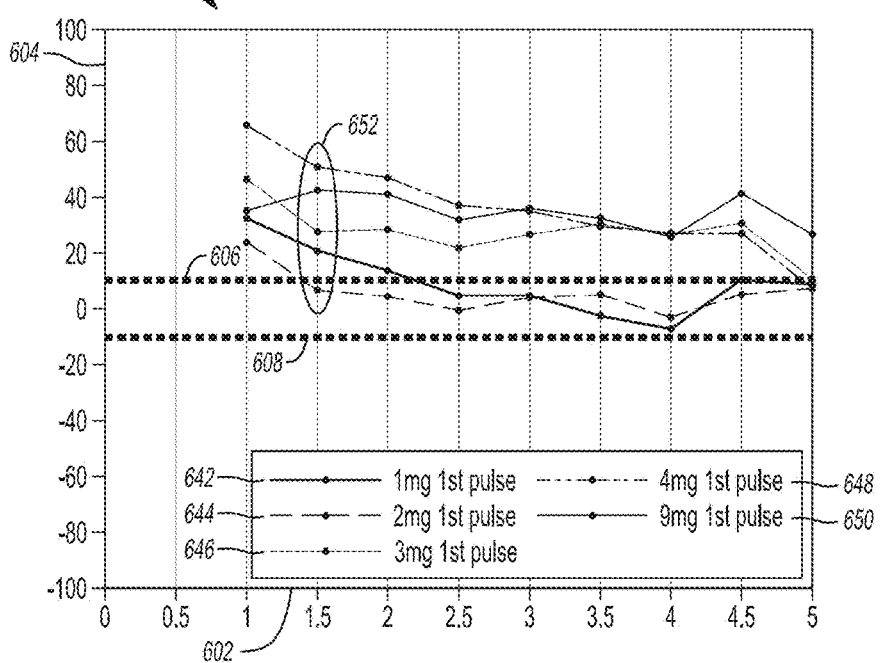
FIG. 6C is a plot of percent fuel mass error versus desired subsequent pulse fuel mass corresponding to commanded pulse width adjustment for dwell time and preceding pulse fuel mass.

FIG. 6A through FIG. 6C each describe aspects of the error in fuel mass delivery before and after the application of adjustments for the effects of both dwell time from the preceding injection and the fuel mass of the preceding injection. Referring to FIG. 6A, plot 600 depicts error resulting from a non-adjusted input to a closely-spaced second fuel injection pulse. Horizontal axis 602 represents a desired fuel mass of the subsequent second injection pulse in mg, and vertical axis 604 represents a percentage deviation of an actual injected fuel mass from a desired fuel mass of the subsequent injection pulse. Boundaries 606 and 608 are depicted for reference, and represent +10% error and −10% error, respectively. It can be seen from plot 600 that with no compensation, error values can be such that a fuel mass quantity of a closely-spaced second injection pulse is largely uncontrolled. Curve 610 represents an error profile corresponding to a subsequent fuel injection pulse dwell of 500 μs following a 1 mg first pulse. Similarly, curve 612 represents an error profile corresponding to a subsequent fuel pulse having a 0.5 μs dwell following a 2 mg preceding pulse. For example, both of curves 610 and 612 exhibit over 200% error when a subsequent injection pulse is desired to be 1.5 mg at about location 614. Such magnitude of error can detract from combustion efficiency.

Referring to FIG. 6B, compensation for dwell time since a preceding pulse is applied to the commanded pulse width FPW of the subsequent fuel injection pulse. Plot 620 also depicts percentage error of delivered fuel mass, and shows the effect of dwell compensation. Curves 622, 624, 626, 628, and 630 represent the error of a closely-spaced (e.g., dwell time of about 500 μs or less) second injection pulse where the preceding first pulse delivered fuel masses of 1 mg, 2 mg, 3 mg, 4 mg, and 9 mg, respectively. Location 632 shows improvement in the accuracy of a closely-spaced subsequent injection pulse using compensation for the dwell time since the preceding pulse. It should be noted that the profiles of each of the subsequent pulse curves result in an order according to the mass of the preceding pulse (i.e., 9 mg having a large error in a positive direction; 1 mg having error in a negative direction). This trend relates to the absence of compensation for mass of the preceding pulse. Using the same example as discussed above in reference to FIG. 6A, it may be seen that for a desired fuel mass of 1.5 mg, error of the subsequent pulse is significantly reduced to a range of between about +60% error and about −20% error (i.e., about an 80% total error spread across a range of masses of the preceding fuel pulse).

Referring to FIG. 6C, compensation for the fuel mass of the preceding pulse is applied in addition to dwell compensation. Plot 640 also depicts percentage error of delivered fuel mass, and shows the effect of the combined compensation schemes. Curves 642, 644, 646, 648, and 650 represent the error of a closely-spaced (i.e., about 500 μs) subsequent injection pulse where the preceding pulse was 1 mg, 2 mg, 3 mg, 4 mg, and 9 mg, respectively. Location 652 shows the further improvement in the accuracy of the closely-spaced second injection pulse when using compensation for both of the dwell time since the preceding pulse and the fuel quantity of the preceding pulse. Using the same example as discussed above in reference to FIG. 6A and FIG. 6B, it may be seen that for a desired fuel mass of 1.5 mg, error of the second pulse is further improved to a range of between about +45% error and about −7% error (i.e., about a 50% total error spread across a range of masses of the preceding fuel pulse). It may further be noted that the profiles of each of the subsequent pulse curves no longer rank in order of preceding pulse fuel mass once mass compensation is applied. While error is still present under this condition using open-loop control, the improvement in accuracy lends itself to the application of additional mean-centering using a closed-loop feedback control strategy discussed in more detail below.

Additional operating factors may reduce accuracy and/or precision of subsequent closely-spaced fuel injection pulses. For example, the variation of mechanical and electrical components within each injector can cause substantial quantity variations from injector to injector (for the same design/model of the injectors) even when open loop control is applied. Injection quantity has high correlation with the opening time of the injection. This relationship holds true for both single and multiple injection scenarios. Note that the opening time for an injection is defined as the amount of time that fuel is actually flowing through the injector. As such, a closed-loop control can be used to control each injection to a desired quantity by controlling the opening time of the injection to a desired opening time, which is characterized offline based on a set of reference injectors. Opening time is controlled by modifying the pulse width command of the injection. As discussed in more detail below, opening time is calculated as the difference between the closing time and the opening delay of each injection. Closing time can be measured for each injection using the injector residual voltage. However, under general operating conditions, the opening delay cannot be readily measured for each injection pulse. As such, estimating the opening delay for each injection may enhance the ability to apply closed-loop control.

The opening delay of an injection is affected by the previous injection. The effect of the previous injection on the opening delay can be captured as a function of the dwell and previous injection mass. Because opening delay is difficult to measure for each injection, this function may be calibrated offline based on a population of injectors. With this calibration, opening time can be estimated in real-time and closed-loop control can be applied.

It should be noted that the open-loop pulse width compensation used for open-loop feedforward control is correlated to the opening delay variation. As such, it is possible to use that calibration to represent opening delay variation instead of calibrating an opening delay function separately. However, there may be sufficient difference between the two that it may be desirable to establish the variation in opening delay as a separate control calibration to achieve improved closed-loop feedback control accuracy. The control methodology discussed herein may utilize feedback signals indicative of fuel injector residual voltage to accurately control very small pulse quantities (e.g., 1-2 mg). This control methodology improves the control accuracy and control robustness of a feedforward control strategy. Improved accuracy and robustness allow the potential use of the 1-2 mg region to improve combustion performance.

Figure 7B:
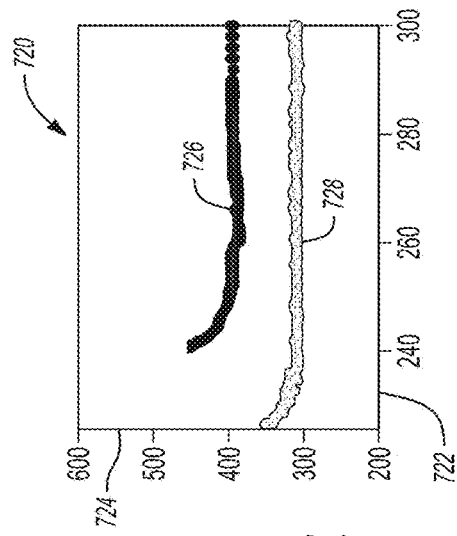
FIG. 7B is a plot of first and subsequent pulse opening delay versus commanded pulse width with no adjustment.
Figure 7D:
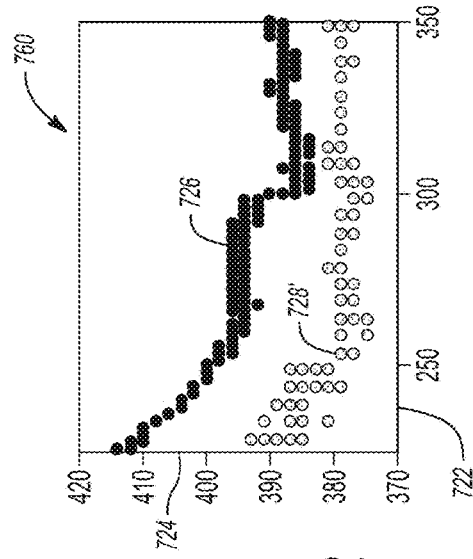
FIG. 7D is a plot of subsequent pulse opening delay versus commanded pulse width with the same adjustment for dwell time and preceding pulse fuel mass as FIG. 7C.
Figure 7A:
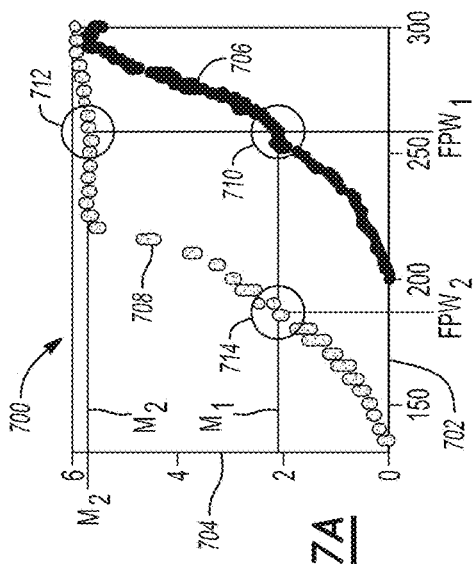
FIG. 7A is a plot of first and subsequent injection pulse fuel masses versus commanded pulse width with no adjustment.

FIGS. 7A through 7D depict the effect of a shortened open time of the subsequent injection pulse. FIG. 7A is a plot of fuel quantity delivered for a preceding pulse and a closely-spaced subsequent pulse without opening time compensation. Horizontal axis 702 represents a commanded fuel pulse width in μs. Vertical axis 704 represents delivered fuel mass in mg. A fuel mass profile of an initial pulse is represented by curve 706, and a profile for the fuel mass of a second closely-spaced pulse is represented by curve 708. As discussed above, a commanded fuel pulse width $FPW_1$ yields about 2 mg from the preceding pulse (e.g., mass $M_1$ near location 710), but the same $FPW_1$ command yields almost 6 mg from the subsequent pulse (e.g. mass $M_2$ near location 712).

FIG. 7B corresponds to the fuel pulses depicted in 7A, and includes plot 720 that depicts opening delay of a fuel injector as a function of commanded pulse width. Horizontal axis 722 represents a commanded fuel pulse width in μs, and vertical axis 724 represents opening delay of the fuel injector in μs. Curve 726 represents the response time of the preceding pulse, and curve 728 represents response time for a closely-spaced subsequent pulse. As described above, the subsequent pulse exhibits a quicker opening response time (i.e., smaller opening delay) across the range of commanded pulse widths compared to the preceding pulse. Furthermore, the opening delay is substantially constant for all injection with exception for those with very small injection quantity (small pulse width command).

Figure 7C:
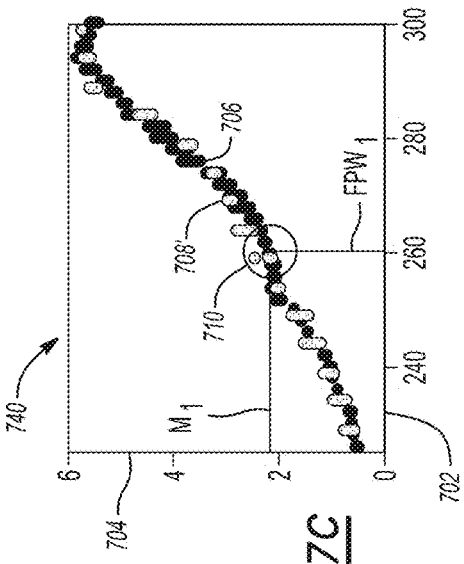
FIG. 7C is a plot of first and subsequent injection pulse fuel masses versus commanded pulse width with adjustment for dwell time and preceding pulse fuel mass.

Compensation may be applied to the commanded pulse width FPW to shift the flow curve of the subsequent injection onto that of the preceding injection (e.g., FIG. 7C). Referring back to FIG. 7A, an adjusted fuel pulse width command $FPW_2$ may be applied for the closely spaced second pulse to yield the desired uniform mass of 2 mg (e.g. mass $M_1$ near location 714). In at least one example, by issuing $FPW_1$ followed by $FPW_2$, each commanding different pulse widths may result in first and second injection pulses each having a uniform mass.

The adjustment to the commanded fuel pulse width may be applied as a standard shift to the subsequent pulse width command. Referring to 7C, plot 740 depicts fuel mass results of a shifting the subsequent fuel pulse command. Applying the shift to the second commanded pulse reduces the difference between the fuel mass delivered by the preceding pulse (i.e., curve 706) and the second pulse (i.e., curve 708'). Thus a more consistent and predictable overall fuel mass may be obtained for subsequent fuel pulses. However the shift in commanded pulse width does not completely account for discrepancies in the differences in the opening response time of the subsequent fuel pulse. FIG. 7D corresponds to FIG. 7C, and shows the effect of applying the same shift in the commanded pulse width on opening delay. Plot 760 indicates that a FPW command shift for preceding pulse mass and dwell time does not represent the difference in the opening response time of the subsequent pulse. Since the closed-loop control ultimately controls the opening time of the injection pulse, the uncaptured opening delay will result in suboptimal closed-loop control.

The variation in opening response time due to closely-spaced operation is captured using an offline process which considers subsequent pulse characteristics as a function of dwell and previous commanded pulse width FPW (quantity). Using measured fuel flow information, for example from a flow rate meter, the actual opening time may be directly calculated. From these data, the shift in opening delay due to the previous injection quantity and dwell may be computed for subsequent fuel pulses. In one example, a set of pulse sweep tests may be used to establish the full relationship of opening delay as a function of dwell and the preceding commanded pulse width. Specifically, for a given fuel supply pressure, each of the dwell and preceding injection quantity (i.e., $FPW_1$) may be fixed within known operating ranges. Then the command for the subsequent pulse width (i.e., $FPW_2$) may be swept across its corresponding operating range. As the second pulse width command is indexed, fuel flow rate data may be recorded. This process may then be repeated for known combinations of dwell and the preceding injection quantity. Then the data is processed to extract the opening delay as a function of dwell and preceding injection quantity. It should be noted that the same data acquired during this calibration process may be used for both the feed-forward compensation calibration as well as injector opening delay calibration.

Figure 8:
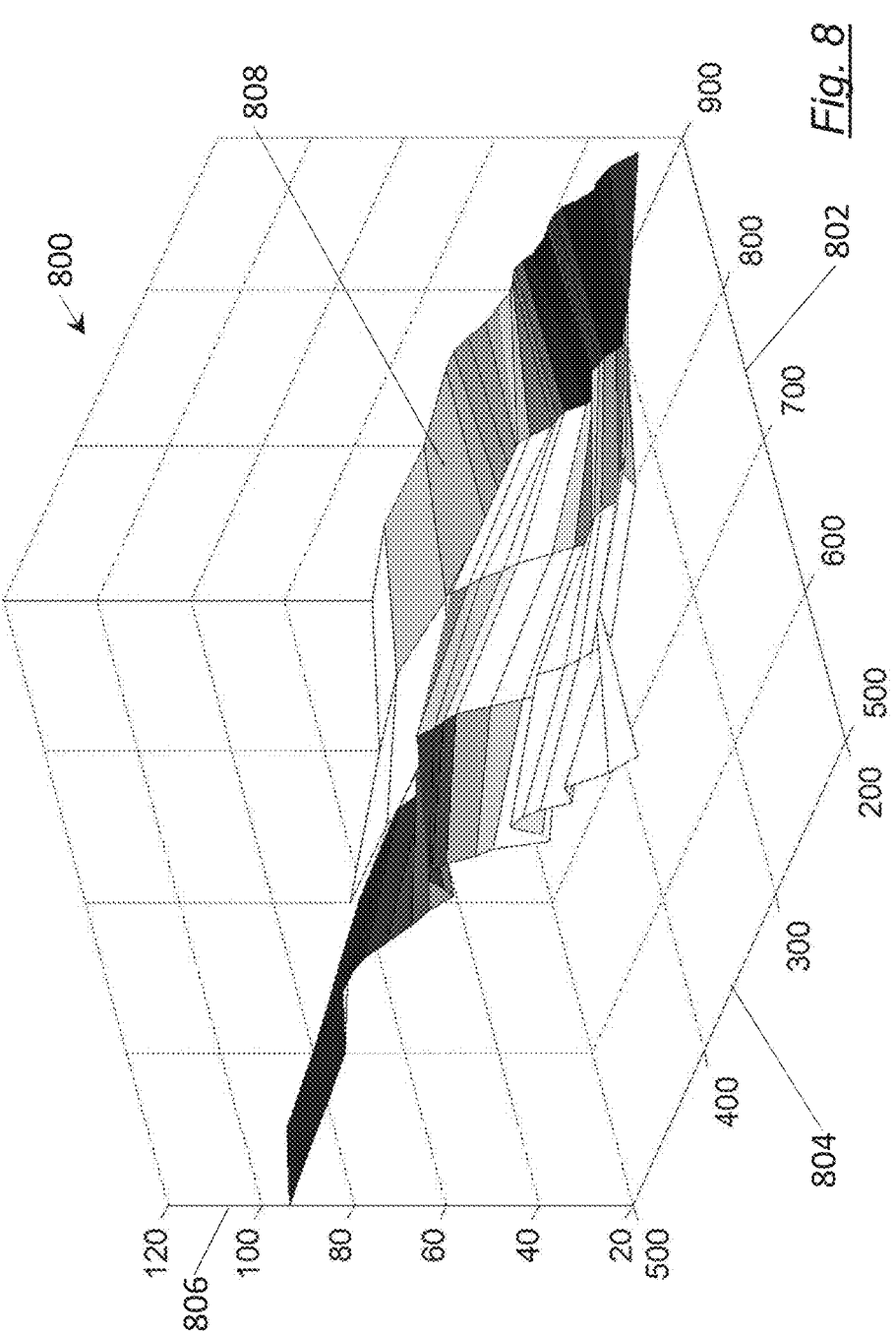
FIG. 8 is a plot of subsequent pulse opening delay variation versus dwell time and preceding pulse FPW command.

FIG. 8 depicts plot 800 having a three dimensional response surface 808 that represents an output of the calibration technique described above. First horizontal axis 802 represents dwell time following the preceding injection pulse in μs. Second horizontal axis 804 represents the commanded pulse width of the first fuel injection pulse in μs (analogous to injection mass of the first pulse). Vertical axis 806 represents the difference between the actual opening delay of a closely-spaced subsequent pulse and the opening delay of the preceding injection pulse. The difference in opening delay is enough to cause significant overcompensation for very small quantity injections using a closed loop control calibration based on pulse size and dwell time. Thus the correlation of a single adjustment based only on pulse size and dwell time still may carry significant error across a range of initial pulse sizes.

Figure 9A:
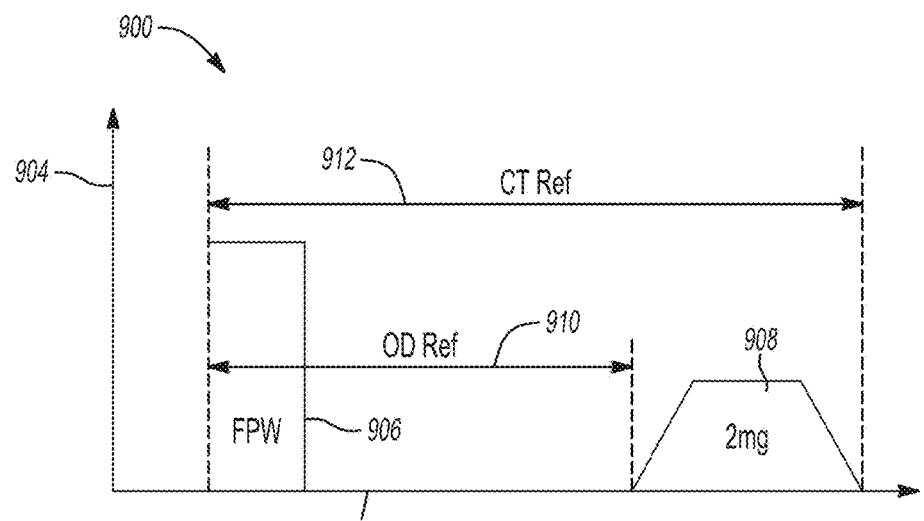
FIG. 9A is plot of fuel pulse command and actual fuel pulse versus time.

FIG. 9A includes plot 900 which depicts operating characteristics of a master sample fuel injector baseline pulse. Horizontal axis 902 represents time and vertical axis 904 represents the presence of a command signal and a subsequent injector response. A FPW command 906 is provided to cause a fuel mass 908 (e.g., 2 mg) to pass through the injector in response. A reference opening delay $OD_{Ref}$ 910 represents a lag from the initiation of the FPW command 906 and the actual opening of the solenoid valve. Similarly, a reference closing time $CT_{Ref}$ 912 represents the time duration between the initiation of the FPW command 906 and the actual closing of the solenoid valve at the end of the fuel pulse. The opening time OT of the fuel pulse is characterized by equation 1 below.

$$OT_{Ref} = CT_{Ref} - OD_{Ref} \qquad (1)$$

Figure 9B:
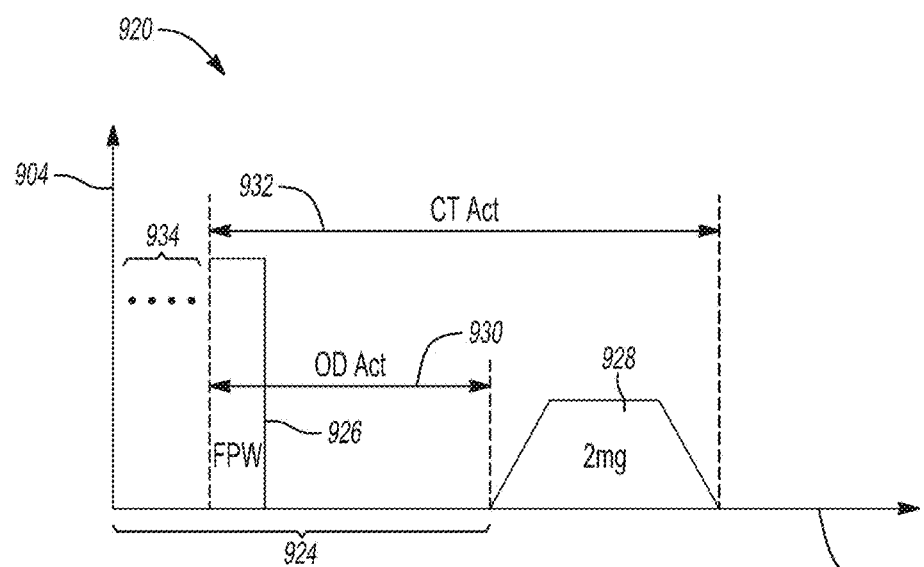
FIG. 9B is plot of fuel pulse command and actual fuel pulse versus time with adjustment for opening time delay.

As discussed above, in order to obtain a closely-spaced subsequent fuel pulse having a predictable fuel mass, the characteristics of the commanded subsequent fuel pulse are adjusted based on the dwell time since the preceding pulse and the fuel mass of the preceding pulse. FIG. 9B includes plot 920 which depicts a closely-spaced subsequent fuel pulse. The actual opening delay $OD_{Act}$ 930 of the injector under a given operating condition may be based both on the predetermined calibration as described previously as well as real-time OD learning based on the operating conditions. When the dwell time 924 is sufficiently short (e.g., less than about 1000 μs), more comprehensive adjustment to the subsequent pulse FPW command 926 is required to obtain a predictable fuel mass 928.

According to an aspect of the present disclosure, the duration of time 934 between the closing of the first fuel pulse 908 is and the start of the subsequent pulse FPW command 926 is reduced to account for changes in the actual opening delay $OD_{Act}$ 930. In this way, a desired dwell time 924 may be obtained in spite of changes in injector solenoid behavior. Any dependence of OD on previous injection is captured as a function of the dwell and previous quantity, and used in feedback control in a similar way as the feedforward pulse width compensation. Closed-loop control works by adjusting the pulse width of the pulse being controlled on a particular injector based on the learned past behavior from the same injector. In at least one example, the controller is programmed to apply closed-loop feedback control to adjust a parameter of a subsequent pulse based on feedback data representing an actual opening delay of at least one earlier subsequent pulse of the same fuel injector.

According to another aspect of the present disclosure, the FPW command 926 of the subsequent pulse is modified in duration to control the actual opening time $OT_{Act}$ (i.e., $OT_{Act} = CT_{Act} - OD_{Act}$). The FPW command of the subsequent fuel pulse is adjusted until the $OT_{Act}$ substantially equals the desired $OT_{Ref}$. In the examples of FIG. 9A and FIG. 9B, the desired fuel pulses yield a uniform fuel mass of 2 mg. However, it should be appreciated that different fuel mass quantities may be desired to be delivered in a non-uniform fashion such that subsequent fuel pulses provide more or less fuel mass to enhance combustion properties.

Figure 10:
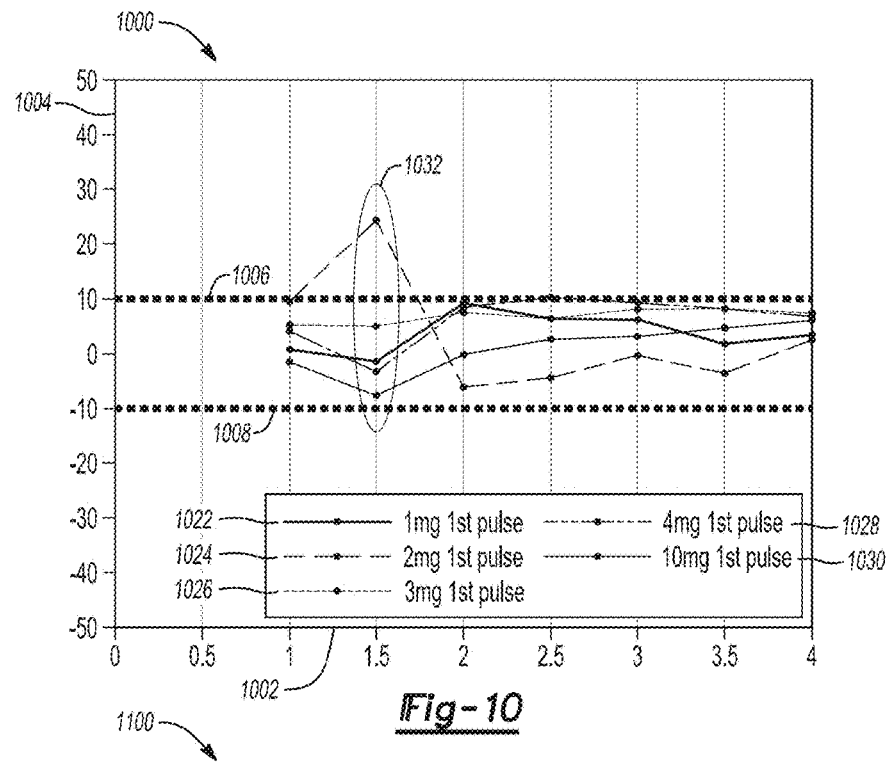
FIG. 10 is a plot of percent fuel mass error versus desired subsequent pulse fuel mass corresponding to a commanded pulse width adjustment for dwell time, preceding pulse fuel mass, and feedback opening delay.

Referring to FIG. 10, plot 1000 shows an example fuel mass error plotted for a second injection based on a 500 µs dwell time. Similar to previous error plots, horizontal axis 1002 represents a desired fuel mass of the subsequent second injection pulse in mg, and vertical axis 1004 represents a percentage deviation of an actual injected fuel mass from the desired fuel mass of the subsequent injection pulse. Boundaries 1006 and 1008 are depicted for reference, and represent +10% error and −10% error, respectively. Curves 1022, 1024, 1026, 1028, and 1030 represent the error of a closely-spaced (e.g., about 500 µs dwell) second injection pulse where the preceding first pulse delivered fuel masses of 1 mg, 2 mg, 3 mg, 4 mg, and 10 mg, respectively. It can be seen from plot 1000 that including closed-loop FPW command adjustments to correct for opening time in addition to the previously discussed open-loop adjustments for fuel mass and dwell time of the preceding injection further reduces fuel mass error relative to previous examples. As a comparison to the example as discussed above in reference to FIGS. 6A through 6C, FIG. 10 shows that for a desired fuel mass of 1.5 mg, error of the second pulse is further reduced to a range of between about +24% error and about −8% error (i.e., about an 32% error spread across a range of masses of the $1^{st}$ fuel pulse).

The previously discussed techniques include applying predetermined calibrations based on a population (e.g., feedforward pulse width compensation and change in opening delay) with feedback control to provide robust metering for a population of fuel injectors. Even in this scenario, a challenge with the above-described controls is that feedback control may still overcompensate and skew fuel mass results delivered from individual injectors having deviation from the larger population. Specifically, and as discussed previously, an average ΔOD (based on a population of injectors) is captured offline as a function of dwell and preceding FPW (which may be analogous to injection quantity). The difference between each individual injector and the calibrated average can be up to 10 µs or more for some dwells and previous injection quantities. Further, the opening delay OD may vary in a ballistic fashion across small quantity masses leading to uncertainty regarding the adjustment quantity. That is, the opening delay is a nonlinear function of FPW for small quantities. Thus offline calibrated ΔOD values may not be precise for each individual injector. Additionally, injector opening characteristic varies nonlinearly for very small injections (e.g., 1-2 mg range, which may be more desirable for use with multiple pulses). This nonlinearity magnifies this difference in the small quantity regions and can cause the closed loop feedback control to overcompensate. Despite applying a predetermined shift for ΔOD, the opening time can vary significantly in the small quantity FPW range.

The amount of compensation required for the nonlinear region can be very similar to the amount of compensation required for adjacent linear regions just outside of the nonlinear fuel pulse behavior. Improved robustness of the fuel injector control is achieved by applying the compensation learned from these other fuel mass regions to the very small quantity fuel masses instead of directly controlling in the nonlinear region. Thus when applying the opening time shift, an adjustment may be made using adjustment parameters based on an adjacent, more stable regions of operation as opposed to utilizing feedback from more unstable small quantity regions.

Figure 11:
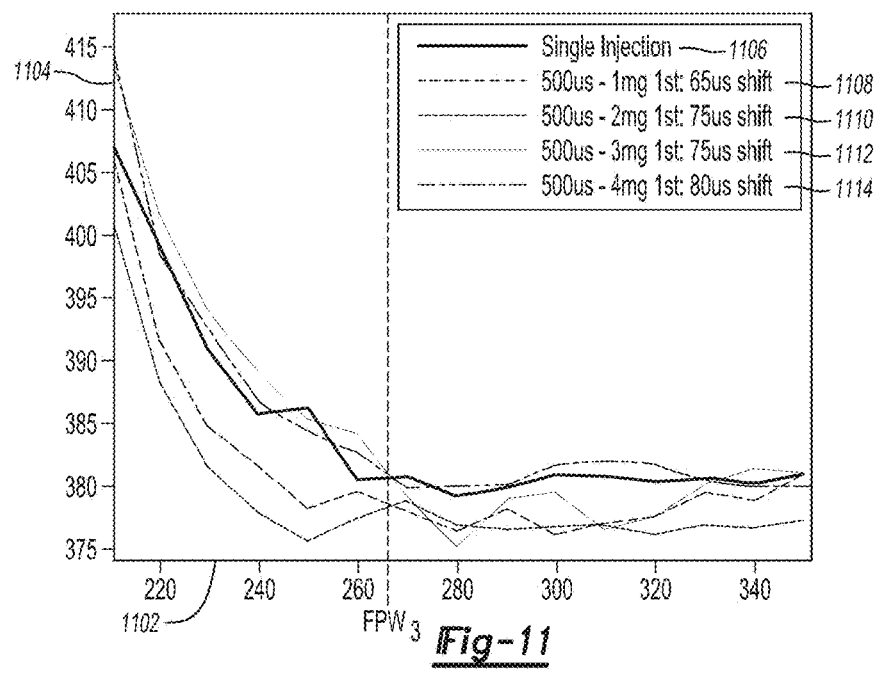
FIG. 11 is a plot of injection pulse opening delay versus commanded fuel pulse width.

Referring to FIG. 11, plot 1100 depicts behavior of injector opening delay OD as a function of the FPW command, previous injection fuel mass, and dwell time. Horizontal axis 1102 represents the FPW command in µs. Vertical axis 1104 represents ΔOT, that is, the difference between actual opening time and the baseline calibration opening time in µs. Curve 1106 represents an OD as a function of the FPW command for a single injection case. Curves 1108, 1110, 1112, and 1114 represent an OD for each of a 1 mg, 2 mg, 3 mg, and 4 mg preceding pulse, respectively. Note that an artificial shift of 65 µs, 75 µs, 75 µs, and 80 µs have been applied to curves 1108, 1110, 1112, and 1114, respectively to provide better alignment of these curves with the single injection curve 1106 for comparison. For the illustrative comparison, all of the subsequent pulses were preceded by a 500 µs dwell time since the preceding pulse (although it should be appreciated that a different set of curves exist for each of a different range of dwell times). Plot 1100 shows that the differences in injector opening delay OD between the single injection and various quantity subsequent injections are larger for smaller quantity injections (i.e., smaller FPW). More specifically, an example fuel pulse command $FPW_3$ may correspond to a desired fuel mass of about 2 mg. FPW commands corresponding to a fuel mass less than a fuel mass threshold (e.g., $FPW_3$, about 2 mg) carry increased variability due to changes in opening delay OD. Such variability causes other portions of the closed-loop control algorithm to overcompensate thereby decreasing accuracy of fuel injection pulses.

Figure 12:
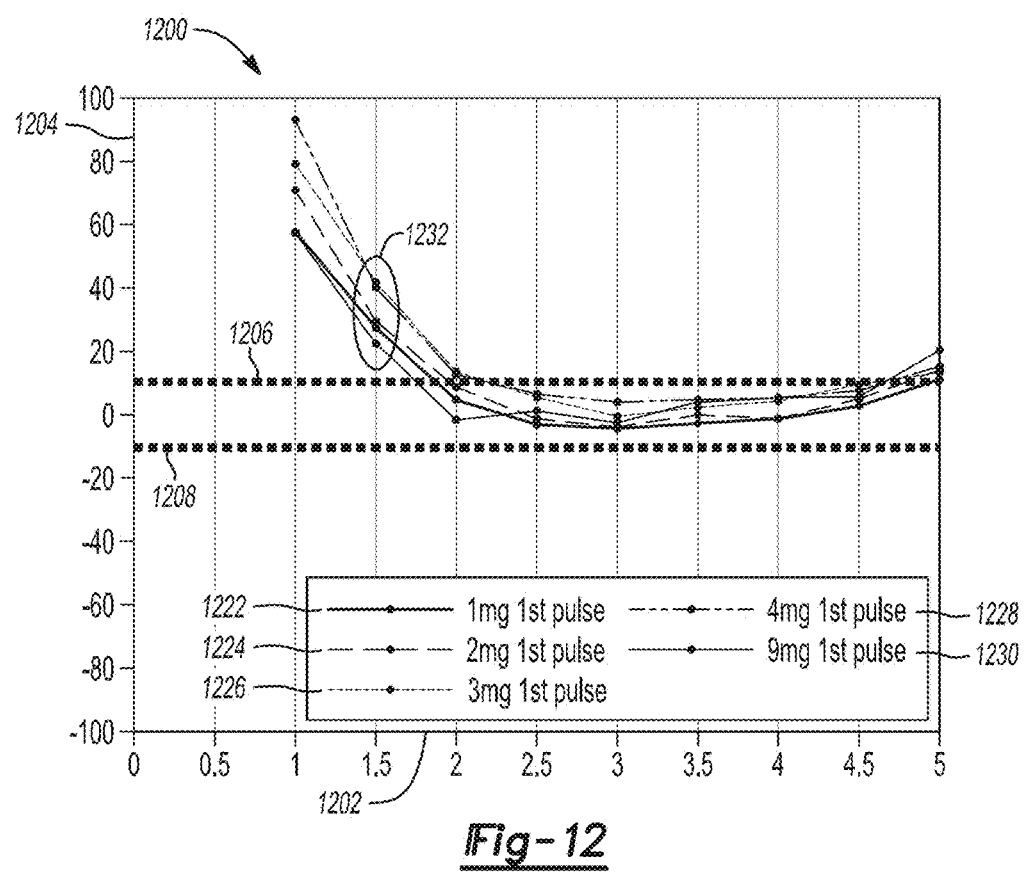
FIG. 12 is a plot of percent fuel mass error versus desired subsequent pulse fuel mass corresponding to a commanded pulse width adjustment for dwell time and preceding pulse fuel mass and feedback opening delay containing error due to injector-to-injector variation.

Referring to FIG. 12, plot 1200 depicts the effect of the overcompensation upon fuel mass error due to applying feedback control for opening delay across the entire range of injection fuel mass. Horizontal axis 1202 represents a desired fuel mass of the subsequent second injection pulse in mg, and vertical axis 1204 represents a percentage deviation of an actual injected fuel mass from a desired fuel mass of the subsequent injection pulse. Boundaries 1206 and 1208 are depicted for reference, and represent +10% error and −10% error, respectively. Curves 1222, 1224, 1226, 1228, and 1230 represent the error of a closely-spaced (e.g., dwell time of about 500 µs or less) subsequent injection pulse where the preceding pulse delivered fuel masses of 1 mg, 2 mg, 3 mg, 4 mg, and 9 mg, respectively. The error profiles of the plotted curves correspond to the application of FPW command compensation for preceding injection pulse fuel mass, dwell time, feedforward opening delay, and feedback control opening delay without special consideration for small quantity pulses. Plot 1200 shows that the overall spread of the error values across the range of injection pulse fuel mass is significantly reduced. However, due to the overcompensation in small quantity regions, significant error remains. While precision is improved, accuracy of the fuel mass delivery suffers in the small quantity ranges related to nonlinearity of OD variability. Considering the example of 1.5 mg desired fuel mass at about location 1232I, and as discussed throughout the present disclosure in reference to error, it may be seen that the control scheme according to FIG. 12 corresponds to an error range from about +20% to +40% depending on the mass of the preceding injection pulse.

Referring back to FIG. 11, fuel injection control is more robust in the fuel mass regions greater than about 2 mg (e.g., corresponding to $FPW_3$), providing a generally constant OD adjustment values across a wide range of FPW command widths. According to an aspect of the present disclosure, a control algorithm may include compensation for injection fuel mass in ballistic regions (e.g., fuel mass quantities less than about 2 mg) that is based upon compensation values for the adjacent fuel mass range which is more stable (e.g., applying control signal adjustment based on the 2-3 mg fuel mass range). Applying ΔOD compensation learned from adjacent stable fuel mass regions to subsequent fuel pulses having a fuel mass less than a threshold may remove overcompensation effects related to nonlinear variance regions. According to one example, the control algorithm applies a feedback control command compensation for opening response from the more stable 2-3 mg range to entire ballistic region.

Figure 13A:
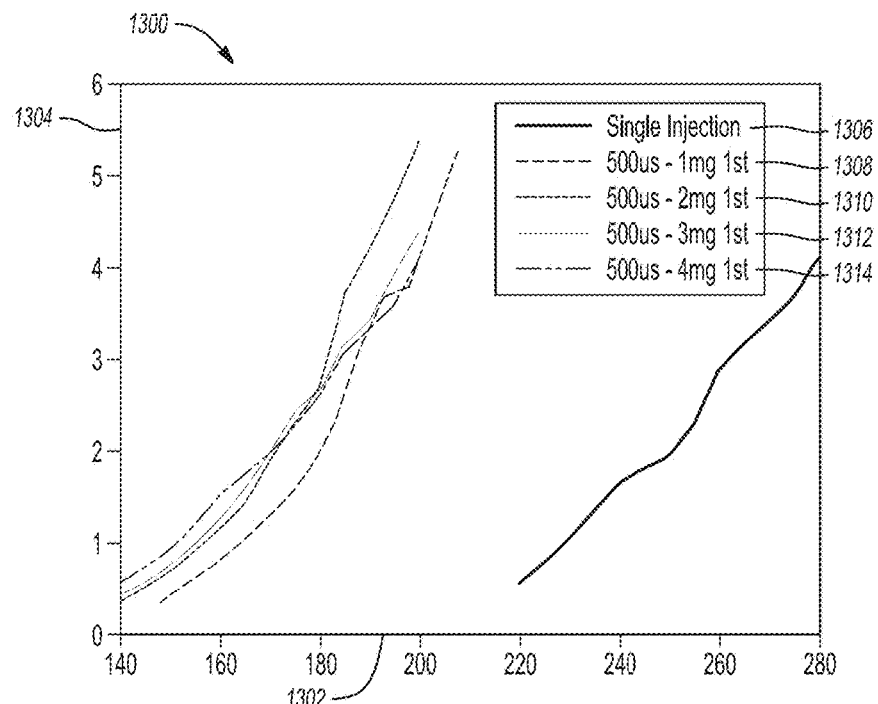
FIG. 13A is a plot of injection pulse fuel mass versus uncompensated commanded pulse width.
Figure 13B:
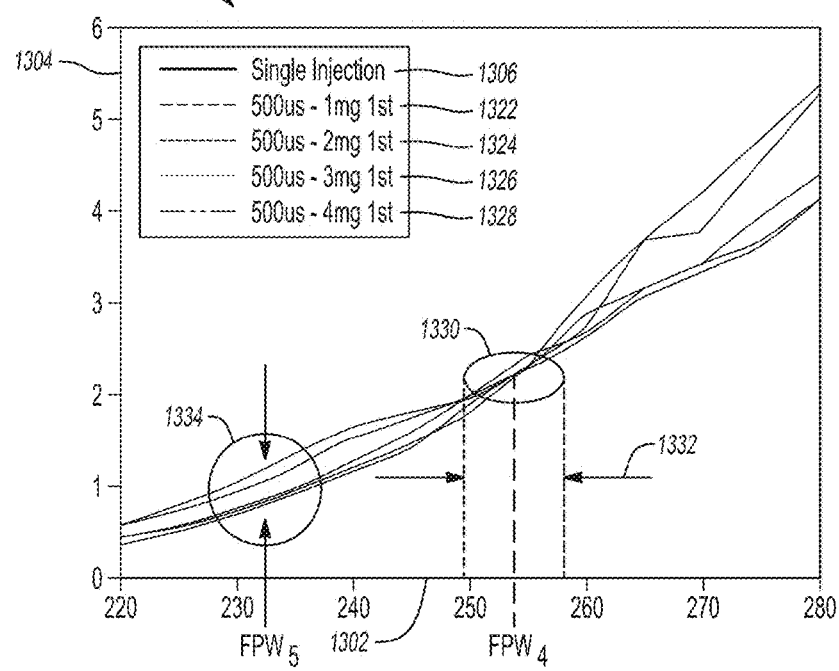
FIG. 13B is a plot of injection pulse fuel mass versus commanded pulse width adjusted based on a region of fuel pulse width having linear opening delay.

Comparatively, FIG. 13A and FIG. 13B show the effect of applying compensation based on a fuel pulse range having less stability which is adjacent to ballistic regions. Plot 1300 shows delivered fuel quantity versus uncompensated commanded pulse width. Plot 1320 shows delivered fuel quantity versus commanded pulse width using opening time compensation in ballistic regions based on values from an adjacent non-ballistic region. Horizontal axes 1302 represent commanded pulse width (FPW) of the subsequent fuel pulse in µs. Vertical axes 1304 represent the desired fuel quantity of the subsequent fuel injection pulse in mg. Curve 1306 represents an initial injection fuel pulse. Curves 1308, 1310, 1312, and 1314 represent closely-spaced (e.g., dwell time of about 500 µs or less) subsequent injection pulses where the preceding pulse delivered fuel masses of 1 mg, 2 mg, 3 mg, and 4 mg, respectively.

As seen from plot 1300 and discussed above, subsequent closely-spaced fuel pulses require significantly different FPW commands as compared to the initial pulse to yield desired fuel masses. According to aspects of the present disclosure, an adjustment for the reduced opening delay of subsequent pulses is applied based on a value derived from the more stable portion of ballistic region 1332. In the example depicted, an adjustment corresponding to $FPW_4$, yielding about 2 mg, is applied across the ballistic range of FPW commands less than $FPW_4$. Curves 1322, 1324, 1326, and 1328 represent closely-spaced (e.g., dwell time of about 500 µs or less) subsequent injection pulses where the preceding pulse delivered fuel masses of 1 mg, 2 mg, 3 mg, and 4 mg, respectively. The curves are adjusted with special consideration for the small quantity pulse ranges. The adjustment causes the highest degree of convergence at about location 1330. At the same time, applying the same adjustment in the small quantity region also causes convergence at about location 1334. In the example of FIG. 13B, the fuel error between the initial pulse and subsequent pulses associated with the $FPW_5$ command is reduced to less than about 0.3 mg. According to at least one example, the controller is programmed to, in response to a target fuel mass of the subsequent pulse being less than a mass threshold, apply an adjustment to a parameter of the subsequent pulse based on a fuel mass region that is greater than the mass threshold.

Figure 14:
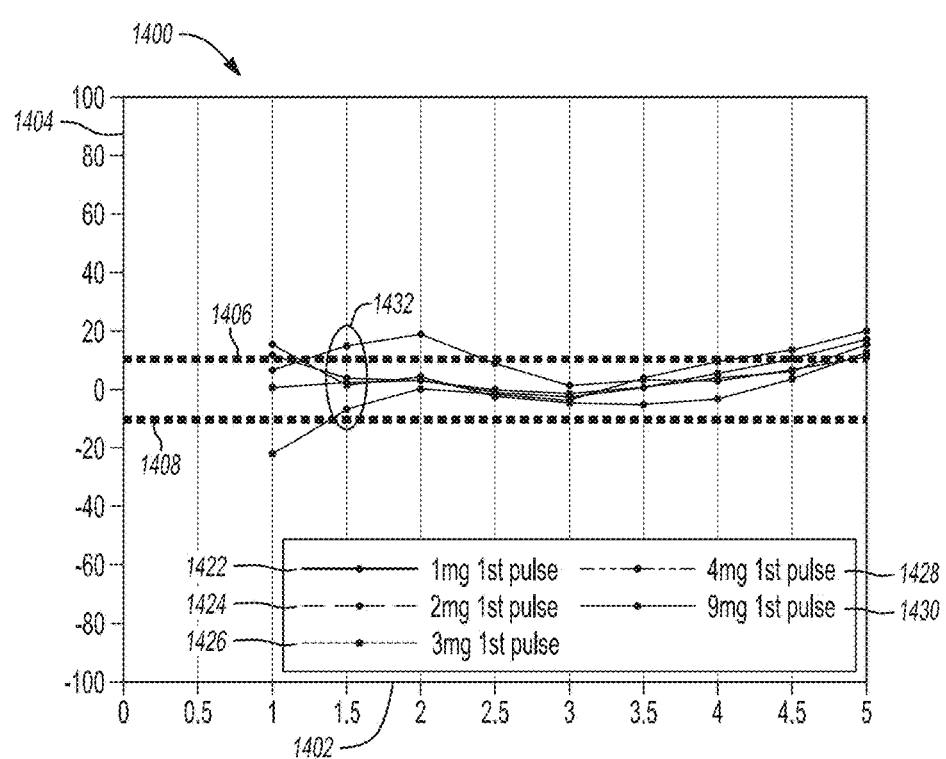
FIG. 14 is a plot of percent fuel mass error versus desired subsequent pulse fuel mass corresponding to a commanded pulse width adjustment for dwell time and preceding pulse fuel mass and feedback opening delay with further small quantity compensation.

Plot 1400 represents error output resulting from the combination of each of the several fuel injection control strategies discussed herein. The error profiles plotted correspond to the application of FPW command compensation for preceding injection pulse fuel mass, dwell time, feedforward opening delay, feedback control opening delay, as well as imparting special consideration for small quantity pulses less than a fuel mass threshold. That is, the learned OD adjustment for certain small quantities is disregarded, then supplanted by learned OD adjustments corresponding to adjacent more stable fuel mass regions. Horizontal axis 1402 represents a desired fuel mass of the subsequent second injection pulse in mg, and vertical axis 1404 represents a percentage deviation of an actual injected fuel mass from a desired fuel mass of the subsequent injection pulse. Boundaries 1406 and 1408 are depicted for reference, and represent +10% error and −10% error, respectively. Curves 1422, 1424, 1426, 1428, and 1430 represent the error of a closely-spaced (e.g., dwell time of about 0.5 ms or less) subsequent injection pulse where the preceding pulse delivered fuel masses of 1 mg, 2 mg, 3 mg, 4 mg, and 9 mg, respectively. Plot 1400 shows that the overall spread of the error values across the range of injection pulse fuel masses is significantly reduced, as well as improved accuracy in small quantity fuel mass regions. Considering the example of 1.5 mg desired fuel mass as discussed throughout the present disclosure in reference to error, it may be seen that the control scheme according to FIG. 14 corresponds to an error range from about +12% to −10% (i.e., about an 22% total error spread across a range of masses of the preceding fuel pulse) depending on the mass of the preceding injection pulse. The improved accuracy significantly enhances the ability to tightly control individual rapid pulses of fuel even at very small quantities.

While the present disclosure has presented the closely-spaced fuel pulse control in the context of a "first" pulse and a subsequent pulse, it is understood that the described method can also be applied to any of the subsequent pulses as well. For example, a third pulse can be considered the "second" pulse to the actual second pulse. Calibrations that are developed as a function of the quantity of previous pulse and the dwell can therefore still be applied to later subsequent pulses. It is also understood that a pulse within a series of injection pulses may be affected by interactions of one or more prior injections. Calibration data and stored algorithm therefore may be more expansive using the techniques discussed herein and account for a larger number of pulses within a series.

It is further contemplated that the technique of using multiple closely-spaced injection events to control spray penetration may apply to any type of fast cycling fluid spray injectors that operate to spray fluid in a variety of applications not limited only to engine combustion chambers. Multiple successive injections may be used in numerous applications, such as, but not limited to urea injection used for diesel selective catalytic reduction (SCR) system, spray painting and other dispensing of liquid medications.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a combustion engine having at least one cylinder to burn a fuel;
a fuel injector to supply an aggregate target fuel mass to the at least one cylinder; and
a controller programmed to:
cause the fuel injector to supply a series of fuel pulses that sum to the aggregate target fuel mass;
adjust a commanded duration of a subsequent pulse of the series of pulses from a target pulse duration value based on at least one of dwell time since a preceding pulse, a fuel mass of the preceding pulse, and an opening delay of the preceding pulse; and
modify the duration of the subsequent pulse in response to the dwell time since the preceding pulse being less than a dwell threshold.

2. The vehicle of claim 1 wherein the controller is further programmed to modify the subsequent pulse based on an opening delay calculated using a target dwell time since the preceding pulse and a fuel mass of the preceding pulse.

3. The vehicle of claim 1 wherein the controller is further programmed to, in response to a target fuel mass of the subsequent pulse being less than a mass threshold, apply an adjustment to a parameter of the subsequent pulse based on a fuel mass region that is greater than the mass threshold.

4. The vehicle of claim 1 wherein the controller is further programmed to adjust the commanded duration of the subsequent pulse based on a fuel pulse width command of the preceding pulse.

5. The vehicle of claim 1 wherein the controller is further programmed to apply closed-loop feedback control to adjust a parameter of the subsequent pulse based on feedback data representing an actual opening delay of at least one earlier subsequent pulse.

6. The vehicle of claim 1 wherein the commanded duration of the subsequent pulse is adjusted to a pulse width different from a nominal pulse width to supply a subsequent pulse fluid mass substantially the same as a preceding pulse fluid mass.

7. A method of providing closely-spaced fluid pulses through a solenoid-driven valve comprising:
providing a pressurized fluid at a valve inlet;
commanding a first pulse of the valve to supply a first fluid mass through the valve;
commanding a second pulse of the valve sequentially following the first pulse, wherein a second pulse width is adjusted based on at least one of a dwell time following the first pulse and the first fluid mass such that a second fluid mass is substantially the same as a target fluid mass; and
adjusting a pulse width of the second pulse in response to a change in an opening delay based on a target dwell time since the first pulse and based on the first fluid mass.

8. The method of claim 7 further comprising modifying a duration of the second pulse width in response to the dwell time since the first pulse being less than a dwell threshold.

9. The method of claim 7 wherein the target fluid mass of the second pulse substantially equals the first fluid mass.

10. The method of claim 7 further comprising, in response to a target fuel mass of the second pulse being less than a mass threshold, apply an adjustment to a parameter of the second pulse based on a fuel mass region that is greater than the mass threshold.

11. The method of claim 7 further comprising applying closed-loop feedback control to adjust a parameter of the second pulse based on feedback data representing an actual opening time of at least one earlier subsequent pulse.

12. A fluid delivery system comprising:
a solenoid configured to selectively lift a pintle of a valve to allow a pressurized fluid to pass through the valve;
a power source to supply energy to activate the solenoid;
a controller programmed to issue commands to actuate the solenoid to cause a series of sequential fluid pulses wherein a commanded opening delay of a subsequent pulse of the series of sequential pulses is adjusted based on at least one of a dwell time since a preceding pulse, a fuel mass of the preceding pulse, and an opening delay of the preceding pulse; and
wherein the controller is further programmed to apply closed-loop feedback control to adjust a parameter of the subsequent pulse based on feedback data representing an actual opening time of at least one earlier subsequent pulse of the valve.

13. The fluid delivery system of claim 12 wherein the controller is further programmed to modify a commanded duration of the subsequent pulse in response to a dwell time following the preceding pulse being less than a dwell threshold.

14. The fluid delivery system of claim 12 wherein the controller is further programmed to, in response to a target fluid mass of the subsequent pulse being less than a mass threshold, apply an adjustment to a pulse width command of the subsequent pulse based on a fuel mass region that is greater than the mass threshold.

15. The fluid delivery system of claim 12 wherein a pulse width command of the subsequent pulse width is reduced in response to a decrease in the dwell time since the preceding pulse.

16. The fluid delivery system of claim 12 wherein the controller is further programmed to adjust a commanded width of the subsequent pulse from a target pulse duration value based on at least one of an open duration of the preceding pulse and a dwell time since the preceding pulse.

17. The fluid delivery system of claim 12 wherein a first fluid mass of the preceding pulse and a second fluid mass of the subsequent pulse sum to a predetermined aggregate target fuel mass.

* * * * *